Feb. 9, 1960 P. RIEGGER ET AL 2,924,497
TACHOGRAPH
Filed Dec. 5, 1956 2 Sheets-Sheet 1
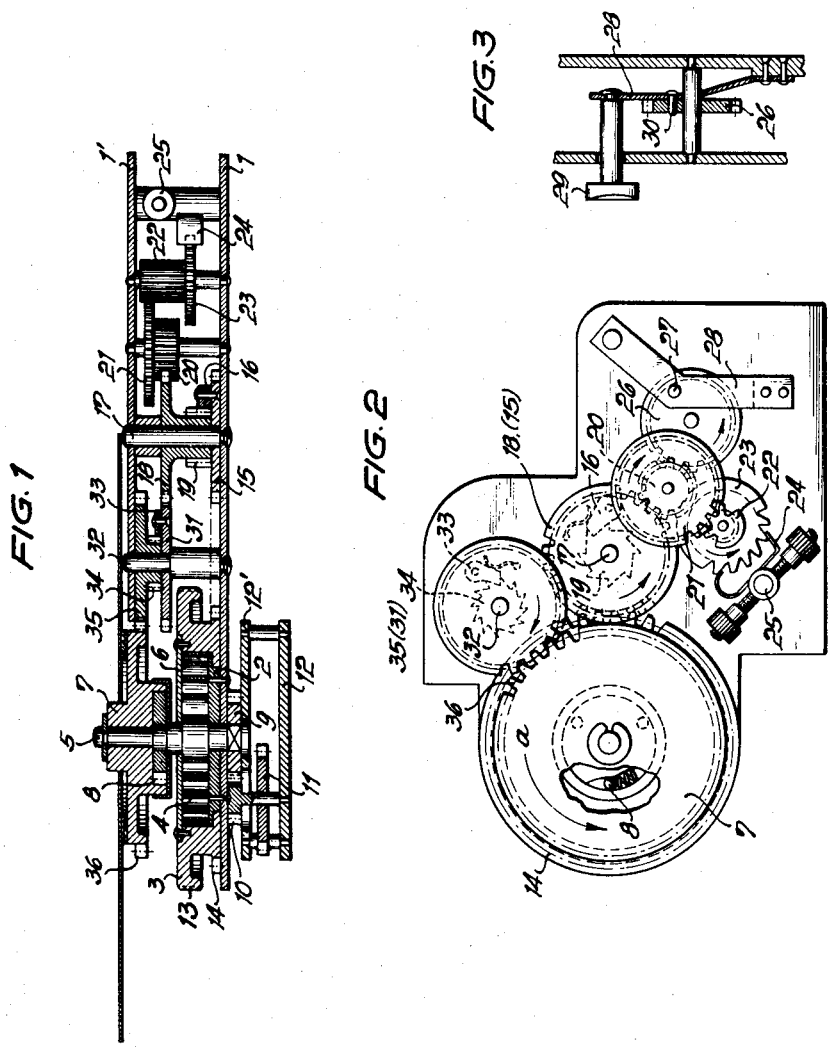
INVENTOR
Paul Riegger and Hermann Bertram
By Michael S. Striker

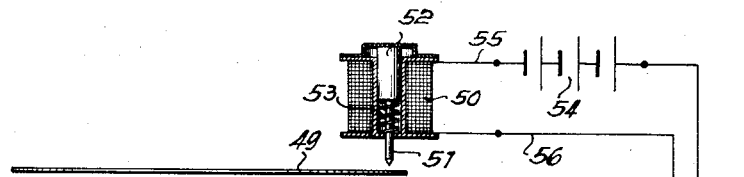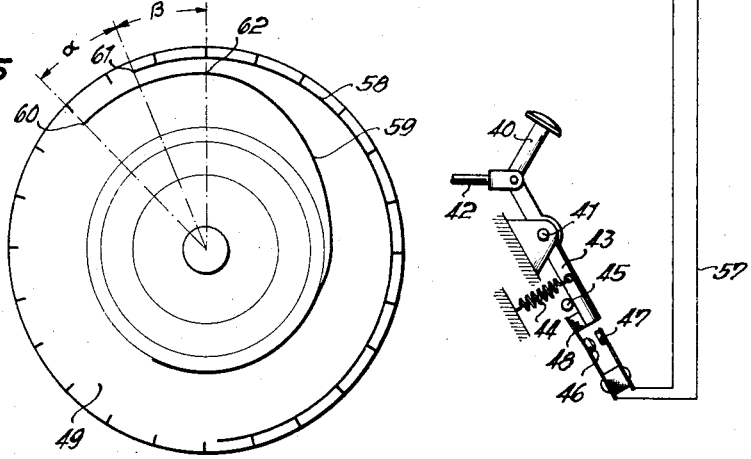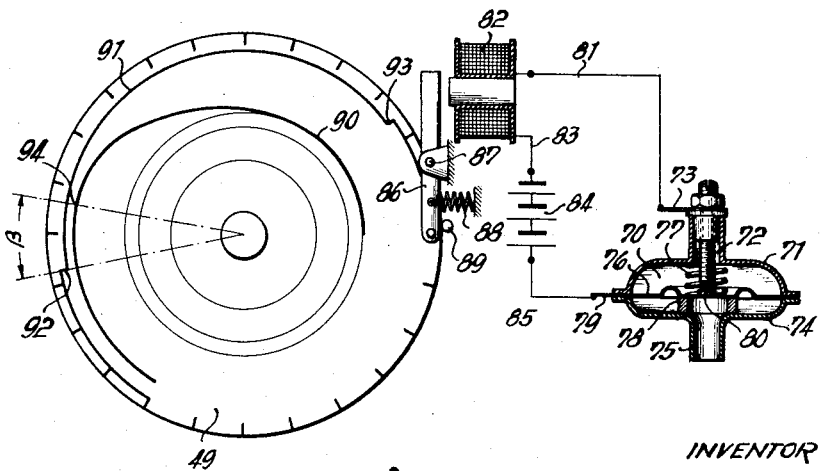

United States Patent Office 2,924,497
Patented Feb. 9, 1960

2,924,497
TACHOGRAPH

Paul Riegger and Hermann Bertrang, Villingen/Schwarzwald, Germany, assignors to Kienzle Apparate G.m.b.H., Villingen/Schwarzwald, Germany Application December 5, 1956, Serial No. 626,415

10 Claims. (Cl. 346—121)

The present invention relates to tachographs.

Tachographs are used on moving vehicles to give a record of the speed of operation of the vehicle as well as the duration of operation thereof and the distance traveled. Normally a sheet of a tachograph on which the markings of the operating characteristics of the vehicle are indicated moves very slowly with respect to a marking instrument so that, for example, a circular marking sheet may move through a single revolution in 24 hours. Certain special operations of the vehicle such as the braking or sudden acceleration thereof may be of particular interest. Thus, it may be of interest to know the rate at which the speed of the vehicle diminishes during braking thereof by a particular operator, for example. With a conventional tachograph the period of time during which a braking operation or the like takes place is so small in comparison to the entire matter indicated on the single sheet, that the behavior of the vehicle during such a special operation such as braking or sudden accleration appears on an extremely small scale on the sheet and it is therefore extremely difficult to obtain from a conventional tachograph an easy accurate indication of the behavior of a vehicle during the performance of special operations of short duration.

One of the objects of the present invention is to provide a tachograph which is capable of indicating on a relatively large scale the manner in which a vehicle operates while it is performing a special operation such as braking or sudden acceleration.

Another object of the present invention is to provide a tachograph capable of indicating such a special operation in an enlarged clear manner without in any way interfering with the conventional normal operation of the tachograph to indicate the operation of the vehicle over a relatively long period of time.

A further object of the present invention is to provide a structure capable of accomplishing all of the above objects and at the same time composed of simple and ruggedly constructed elements which are very reliable in operation.

With the above objects in view, the present invention mainly consists of a tachograph which includes a carrier means for carrying a sheet or the like on which the operation of a vehicle is recorded. A first drive means is operatively connected to the carrier means for driving the latter at a relatively slow rate of speed during normal operation of the vehicle, and a second drive means is operatively connected to the carrier means for driving the latter at a relatively high rate of speed during special operations of short duration, such as braking or acceleration of the vehicle, so that the recording of such a special operation is distributed over a relatively large portion of a sheet moved by the carrier means to enable such a special operation to be indicated at a large scale.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig 1 is a sectional elevational view of a tachograph according to the present invention, the gear train of Fig. 1 being developed with the elements thereof spread out so as to clearly illustrate the elements of the tachograph;

Fig. 2 is a plan view of the structure of the invention;

Fig. 3 is a fragmentary sectional elevational view of a manually operable releasable lock means which cooperates with the gear train of Figs. 1 and 2;

Fig. 4 is a fragmentary partly diagrammatic illustration of one possible means for marking a sheet during a time when a vehicle performs a special operation of short duration;

Fig. 5 illustrates the manner in which a sheet is marked with the arrangement of Fig. 4; and Fig. 6 is a fragmentary diagrammatic illustration of another embodiment of an arrangement for marking a tachograph sheet in accordance with the present invention.

The tachograph of the invention includes a number of elements of conventional construction well known to every person skilled in the art so that such conventional elements are not shown and described in all of their details. Only those elements are shown and described which are necessary to afford an understanding of the invention.

Referring to Fig. 1, it will be seen that the tachograph includes a pair of plates 1 and 1' between which the drive elements of the tachograph are mounted. The lower plate 1 of Fig. 1 carries a housing 3 of a spring motor, this housing 3 being connected to the plate 1 for rotation with respect thereto through the medium of a stepped disc 2 which extends through a central opening of the housing 3 and which is riveted to the plate 1. The spring motor means which includes the outer annular housing 3 furthermore includes a spiral spring 4 and a shaft 5 which is coaxial with and extends from the interior of the housing 3 and about which the spring 4 is coiled, this spring 4 being respectively fixed at its ends to the shaft 5 and the housing 3. The housing 3 is closed with a cover 6 formed with an opening through which the shaft 5 extends, this shaft 5 being rotatable about its axis with respect to the housing 3 and the plate 1, as is evident from Fig. 1.

At its upper end portion, as viewed in Fig. 1, the shaft 5 turnably supports a carrier means in the form of a disc 7 which is freely turnable with respect to the shaft 5 and which rests on a shoulder thereof, as shown in Fig. 1. A one-way transmission in the form of a spring pressed ball 8 interconnects the shaft 5 with the disc 7, the latter being adapted to have a suitable circular sheet placed thereon for rotation therewith to receive markings, in a manner described below. As is particularly evident from Fig. 2, the one-way drive transmission provided by the spring pressed ball 8 which is located in a recess at the outer periphery of a disc fixed to the shaft 5 for rotation therewith and located in a recess formed in the bottom face of the disc 7, enables the disc 7 to turn with the shaft 5 when the latter turns in a counterclockwise direction, as viewed in Fig. 2, as shown by the arrow $a$. As may be seen from Fig. 2, the spring which acts on the ball 8 urges the latter toward the constricted part of the recess of the disc which is fixed to the shaft 5, and the frictional engagement between this disc and the disc 7 is sufficient to cause the latter to turn together with the shaft 5 in the direction of the arrow $a$ of Fig. 2. A suitable plate is fixed to the underside of the disc 7 to retain in the recess at the bottom face of the disc 7 the disc which is fixed to the shaft 5 for rotation therewith as well as the spring pressed ball 8.

The shaft 5 extends through the plate 1 downwardly below the latter and the bottom end of the shaft 5 is connected to a gear 9 which rotates together with the shaft 5. This gear 9 meshes with a gear 10, and the gear 10 is coaxially fixed to a gear 11 which cooperates with a conventional clockwork escapement mechanism which is arranged between the plates 12 and 12' and which is not illustrated. As will be apparent from the description which follows, the housing 3 remain stationary during the normal operation of the apparatus, and the spring 4 drives the shaft 5 which rotates slowly and causes the disc 7 to rotate therewith so as to turn the sheet on the disc 7 with respect to a suitable marking instrument. The speed of rotation of the shaft 5 is controlled by the conventional escapement mechanism which is located between the plates 12 and 12' and which cooperates with the gear 11. This escapement mechanism may be so arranged that the disc 7 together with the sheet thereon turn through a single revolution in 24 hours.

The spring 4 is tensioned by manual turning of the housing 3, and for this purpose the housing 3 is provided with a rough outer peripheral surface 13 which may be knurled, for example. This housing 3 is integrally fixed with a gear 14 which meshes with a gear 15 which carries a spring pressed pawl 16, the gear 15 being carried by the upper face of the lower plate 1, as viewed in Fig. 1. A shaft 17 which extends between the plates 1 and 1' serves to turnably guide the gear 15 for rotation about its axis. This shaft 17 also rotatably supports a gear 18 having fixed to an elongated hub portion thereof a ratchet wheel 19 which cooperates with the spring pressed pawl 16 carried by the gear 15, so that, as is evident from Fig. 2, the gear 15 will turn the gear 18 when the gear 15 turns in a counterclockwise direction, as viewed in Fig. 2, while the gear 18 is free to urn in a counterclockwise direction, as viewed in Fig. 2, without turning the gear 15, and of course the latter is free to turn in a clockwise direction, as viewed in Fig. 2, without turning the gear 18.

The gear 18 meshes with a gear 20 which is coaxially fixed to another gear 21, these gears 20 and 21 being supported for rotation about their axis by a suitable pin carried between the plates 1 and 1'. The gear 21 in turn meshes with a gear 22 which is fixed to an escapement wheel 23, the elements 22 and 23 also being supported for rotation about their axis by a suitable shaft extending between the plates 1 and 1', as is evident from Fig. 1. An escapement member 24 cooperates with the escapement wheel 23 and is affixed to an escapement regulator 25 which is turnable on a pin also extending between and carried by the plates 1 and 1'. The regulator 25 has a pair of threaded portions carrying weights which are adjustable thereon, as is evident from Fig. 2, so that by adjusting the position of the weights the operation of the escapement mechanism 23—25 can be regulated.

The gear 20 also meshes with a gear 26 which is formed with an opening 27 passing therethrough. During the normal operation of the device a pin 30 is located in the opening of the gear 26, as is shown most clearly in Fig. 3, so as to prevent the rotation of the gear 26, and a leaf spring 28 carries the pin 30 and urges the latter into opening 27. A manually operable member 29 is fixed at one end to the leaf spring 28 so that when the operator pushes the member 29 to the right, as viewed in Fig. 3, the pin 30 moves out of the opening 27 of the gear 26 so as to release the latter. Thus, the structure shown in Fig. 3 forms a manually releasable lock means for a purpose described below.

The gear 18 also meshes with a gear 31 which is supported for rotation about its axis by a pin 32 carried by the plate 1, and the gear 31 carries a spring pressed pawl 33 which cooperates with a ratchet wheel 34 also turnably supported by the pin 32. The ratchet wheel 34 is coaxially fixed to a gear 35 as by being formed integrally therewith, and the gear 35 has its teeth in mesh with the teeth 36 fixed to and located at the outer periphery of the carrier means 7.

The above described structure operates as follows:

During normal operations, the manually operable member 29 is in the rest position thereof illustrated in Fig. 3, so that the pin 30 is in the opening 27 of the gear 26 and the latter is prevented from turning. The carrier means 7 is driven by the turning shaft 5 through the one-way transmission 8. The clockwork escapement mechanism located between the plates 12 and 12' regulates the speed of rotation of the carrier means 7 so that the latter turns through a single revolution in 24 hours, for example. During this time the spring housing 3 remains stationary since the gear 14 thereof which is acted on through the gear train 15, 16, 18, 19, 20, 26 is prevented from turning by the releasable lock means formed by the location of the pin 30 in the opening of the gear 26. It should be noted that the disc 7 is free to rotate as a result of the one-way drive provided by the pawl 33 and the ratchet wheel 34. Thus, the latter can turn in a clockwise direction, as viewed in Fig. 2, together with the gear 35 while the disc 7 turns turns in a counterclockwise direction and the gear 31 will remain stationary at this time, so that even though the housing 3 is prevented from rotating there is absolutely no interference with the turning of the shaft 5 and the carrier means 7 therewith.

When it is desired to rotate the carrier means 7 at a much faster rate of speed in order to record the operation of the vehicle during a special function thereof such as braking or acceleration, then the operator presses the button 29 just before the special function is carried out so as to remove the pin 30 from the opening 27 of the gear 26, and thus the latter is free to turn and the gear train controlled by the gear 26 is released. As a result the spring 4 drives the housing 3 together with the gear 14 connected thereto, and through the gear train 15, 16, 18, 19, 31, 33, 34, and 35 the teeth 36 together with the carrier means 7 are rotated. The speed of rotation of the carrier means 7 at this time is controlled through the gear 20 and through the gear 22 by the escapement wheel 23 together with the escapement mechanism 24, 25. Thus, the speed of rotation of the carrier means 7 by suitable adjustments of the escapement member 24 may be tremendously increased and, for example, the carrier means 7 may turn in 24 seconds through a single revolution, so that it turns in 24 seconds through the same distance that it normally turns in 24 hours. At this time the gear 26 also turns, and the gearing is such that the gear 26 turns through a single revolution during the time that the carrier means 7 turns through a single revolution, so that the pin 30 automatically enters again into the opening 27 under the influence of the spring 28 after the gear 26 completes a single revolution so that in this way the rotation of the carrier means 7 at the higher rate of speed is automatically terminated after the carrier means 7 turns through a single revolution. It will be noted that during rotation of the carrier means 7 at the higher rate of speed it overtakes and turns at a faster speed than it would be driven by the shaft 5, and the latter continues to be turned by the spring 4, so that the turning of the shaft 5 is not influenced in any way by the drive means whtich turns the disc 7 at the faster rate of speed.

It will be noted that the spring 4 can be tensioned even though the escapement mechanism 23—25 is stopped, because at this time the pawl 16 simply turns in a clockwise direction, as viewed in Fig. 2, with respect to the ratchet wheel 19.

Figs. 4–6 illustrate two different embodiments of additional structure used to record the braking time of a vehicle.

Referring to Fig. 4, the brake pedal 40 of the vehicle is in the form of a two-armed lever which is supported for turning movement by a stationary pivot pin 41. The rod 42 which is linked to the brake pedal 40 may, for example, cooperate with a mechanical brake, with the piston of a hydraulic brake, or with the air control lever of a pneumatic brake. A spring 44 is connected to the lower arm 43 of the brake pedal 40, and after the brake pedal 40 is actuated, the spring 44 automatically returns the latter to a rest position where the lower arm 43 of the brake pedal engages a stationary stop member 45.

Adjacent the lower end of the arm 43 of the brake pedal 40 is located an electrically conductive springy contact member 46 which is connected at its lower end, as viewed in Fig. 4, to a stationary block of insulating material which carries an opposed electrically conductive contact member 47. The springy contact member 46 tends to move by its own inherent resiliency into engagement with the contact member 47, and the contact member 46 carries at its end which is located opposite the free end of the arm 43 a block 48 of insulating material which engages the arm 43, as is evident from Fig. 4, in the rest position of the parts.

A marking sheet 49 which is adapted to be placed on the carrier means 7 of Fig. 1 is shown in Fig. 4 located beneath an electromagnet 50 which cooperates with a marking instrument 51 connected to the armature 52 of the electromagnet. The marking instrument 51 may be a pencil, pen, or the like. In the normal, idle position of the structure of Fig. 4, the armature 52 together with the instrument 51 are held upwardly in an inoperative position by the spring 53. The coil of the electromagnet 50 is electrically connected to a battery 54 through the lead 55. This coil is also electrically connected with a lead 56 which leads to the contact 47. Finally, a lead 57 leads from the contact 46 back to the battery 54.

Fig. 4 shows the brake pedal 40 in its rest position. As soon as and as long as the operator of the vehicle actuates the brake pedal even by a small amount, the contacts 46 and 47 will engage each other to close the electrical circuit and energize the electromagnet 50. As a result the armature 52 moves down and the marking instrument 51 also moves downwardly to engage the sheet 49, so that a line 58 is made on the sheet 49 as long as the armature 50 is energized. Thus, the line 58 indicates from which moment the brake pedal was actuated and for how long or over what distance the brake pedal was actuated. At the same time, a second line 59 is formed on the sheet 49, as indicated in Fig. 5, and this line 59 indicates the change in speed of the vehicle during the actuation of the brake for a given length of time or over a given distance. The line 59 is marked on the sheet 49 with a suitable pen or the like in a purely conventional manner by a structure which automatically moves the marking pen toward and away from the axis of the sheet 49 according to changes in the speed of movement of the vehicle.

As may be seen from Fig. 5, the point 60 illustrates clearly the moment when the button 29 of Fig. 3 was actuated by the operator in order to set into operation the drive means which rotates the disc 7 together with the sheet 49 at the higher rate of speed. The point 61 indicates the moment when the brake pedal was actuated, while the point 62 indicates the moment when the speed of the vehicle started to diminish. The angle α corresponds thus to the time between the moment of actuation of the button 29 in order to set the faster drive of the tachograph into operation and the moment when the brake pedal was actuated, while the angle β indicates the time lost during actual movement of the brake pedal to a position where it was effective to start an actual reduction in the speed of the vehicle. If the sheet 49 is turned in dependence upon distance rather than time, then the curve 59 shows the reduction in speed over a given distance rather than during a given time. Then the angle β shows the distance traveled during the time between actual engagement of the brake by the operator and actual braking of the vehicle, and this latter value is of course of great significance.

The embodiment which is illustrated in Fig. 6 includes a contact housing 70 made of an insulating, electrically-non-conductive material. This housing 70 includes the upper housing portion 71 which carries a contact screw 72 and a connecting member 73, and the lower housing portion 74 which is connected to a tube 75 which receives fluid under pressure from a brake valve or a brake cylinder. Between the housing portions 71 and 74 is located a metallic electrically-conductive membrane 76 which is urged by a spring 77 against an annular stop member 78 carried by the lower housing portion 74. The arrangement is such that the membrane 76 is sensitive to the pressure of the fluid in the tubular member 75. The membrane 76 carries a contact member 80 and is connected to a solder terminal 79 which may be replaced by a screw contact, if desired, and which is connected through the lead 85 to one pole of a battery 84. The electrical connecting element 73 of the housing portion 71 is connected electrically through the lead 81 to the coil 82 of an electromagnet, this coil also being connected through a lead 83 to the other pole of the battery 84. A lever 86 is arranged so that it extends at least partly over the marking sheet 49, and the lever 86 carries a suitable marking instrument and is turnable about the stationary pivot pin 87. During normal operation, the lever 86 is maintained in a rest position in engagement with a stop member 89 by a spring 88, as illustrated in Fig. 6. The upper free end of the lever 86, as viewed in Fig. 6, acts as an armature of the electromagnet 82. As soon as the brake of the vehicle is actuated so as to increase the pressure of the fluid in the tubular portion 75 even by the smallest amount, the membrane 76 bulges upwardly to place the contact 80 in engagement with the contact screw 72. As a result the electromagnet 82 is energized to cause the lever 86 to turn in a clockwise direction, as viewed in Fig. 6, until the upper end of the lever 86, as viewed in Fig. 6, engages the core of the electromagnet 82. Thus, the marking instrument carried by the lever 86 moves slightly to the left, as viewed in Fig. 6, when the electromagnet 82 is energized.

The curve 90 shows, in the same way as the curve 59 of Fig. 5, the reduction in speed for a given period of time or for a given distance, while the curve 91 indicates the actuation of the brake. The curve 90 of Fig. 6 is obtained in the same way that the curve 59 of Fig. 5 is obtained. The above-described turning of the lever 86 upon energizing of the electromagnet 82 has provided at the point 92 a shifting of the arcuate line 91 inwardly by a predetermined amount, so that the moment when the brake is actuated is clearly apparent. On the other hand, the point 93 clearly indicates when the curve 91 shifts back to its original radial distance from the center of the sheet and thus this point 93 indicates clearly the release of the brake. The instrument which makes the curve 90 is not shown in Fig. 6 for the sake of clarity. It will be noted that until the point 94 of the curve 90 is reached the curve 90 remains pretty much unchanged, while from the point 94 on there is a clear change in the curve 90, so that the point 94 clearly indicates the moment when the speed of movement of the vehicle actually starts to diminish. Thus, the angle β again clearly shows the time or distance during which the brake is actuated but the vehicle has not yet started to reduce its speed.

The above-described structure of the invention is simple and inexpensive to manufacture and if desired can be included in existing devices without difficulty. Of course, other types of measuring, indicating, and recording devices may be used.

It will be understood that each of the elements described above, or two or more together, may also find a useful application in other types of tachographs differing from the types described above.

While the invention has been illustrated and described as embodied in tachographs capable of indicating special operations at an enlarged scale, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. In a tachograph, in combination, rotatable carrier means turnable around a given axis for carrying and turning a circular sheet or the like on which the operation of a vehicle is recorded, said carrier means having a sheet-supporting surface located in a plane normal to said axis so that the circular sheet or the like is supported in a plane normal to said axis and turns in the latter plane during twining of said rotatable carrier means; first drive means operatively connected to said carrier means for rotating the latter at a relatively slow rate of speed during normal operation of the vehicle and during recording of information pertaining to said normal operation on said sheet; second drive means operatively connected to said carrier means for rotating the latter at a relatively high rate of speed during special operations of short duration, such as braking or acceleration of the vehicle, so that the recording of such a special operation is distributed over a relatively large portion of a sheet moved by said carrier means to enable such a special operation to be indicated at a large scale; manually operable control means operatively connected to said second drive means for setting the latter into operation at the will of the operator; and means operatively connected to said second drive means for automatically stopping the operation of said second drive means after one complete revolution of said carrier means and the sheet therewith and resuming rotation of said carrier means by said fixed drive means, so that the recording of the special operation may be distributed around 360° of the sheet while the recording of the information pertaining to the normal operation will be resumed substantially at the point where it was interrupted for the recording of the special operation.

2. In a tachograph as recited in claim 1, said second drive means including a plurality of motion transmitting elements cooperating with each other to transmit the drive of said second drive means, and manually releasable lock means operatively connected to said second drive means for preventing the operation thereof until said lock means is manually released, whereby the motion transmitting elements of said second drive means are maintained stationary by said lock means until the latter is manually released.

3. In a tachograph as recited in claim 1, a single driving motor operatively connected with said first drive means and said second drive means for operating said first and second drive means.

4. In a tachograph, in combination, spring motor means including an outer housing, a drive shaft etxending coaxially from the interior of said housing, and a spiral spring in said housing coiled about said shaft and respectively fixed at its ends to said shaft and housing, said shaft and housing being turnable with respect to each other; carrier means carried by said shaft for carrying a sheet or the like on which the operation of a vehicle is adapted to be recorded; transmission means interconnecting said shaft and carrier means for turning the latter with said shaft when the latter turns in one direction while said housing remains stationary and for freeing said carrier means for rotation at a higher speed than said shaft, said spring motor means being operatively connected to a clockwork escapement mechanism which controls the speed of rotation of said shaft while said housing is stationary; a gear train extending between and operatively connected to said housing and carrier means for driving the latter from said housing, while by-passing said shaft, at a speed greater than said carrier means is turned by said shaft; and manually releasable lock means operatively connected to said gear train for preventing the operation of at least a portion thereof connected to said housing so as to maintain the latter stationary until said lock means is released, said gear train including a one-way drive located between a portion thereof connected to said carrier means and the remainder of said gear train so that said carrier means can be turned by said shaft while said housing is stationary.

5. In a tachograph, in combination, spring motor means including an outer housing, a drive shaft extending coaxially from the interior of said housing, and a spiral spring in said housing coiled about said shaft and respectively fixed at its ends to said shaft and housing, said shaft and housing being turnable with respect to each other; carrier means carried by said shaft for carrying a sheet or the like on which the operation of a vehicle is adapted to be recorded; transmission means interconnecting said shaft and carrier means for turning the latter with said shaft when the latter turns in one direction while said housing remains stationary and for freeing said carrier means for rotation at a higher speed than said shaft, said spring motor means being operatively connected to a clockwork escapement mechanism which controls the speed of rotation of said shaft while said housing is stationary; a gear train extending between and operatively connected to said housing and carrier means for driving the latter from said housing, while by-passing said shaft, at a speed greater than said carrier means is turned by said shaft; manually releasable lock means operatively connected to said gear train for preventing the operation of at least a portion thereof connected to said housing so as to maintain the latter stationary until said lock means is released, said gear train including a one-way drive located between a portion thereof connected to said carrier means and the remainder of said gear train so that said carrier means can be turned by said shaft while said housing is stationary; and an escapement mechanism operatively connected to said gear train for controlling the speed of rotation of said carrier means when said lock means is released.

6. In a tachograph as recited in claim 1, the speed of the vehicle being recorded during rotation of said carrier means by said first drive means as well as during rotation of said carrier means by said second drive means, a marking instrument positioned for movement toward and away from a predetermined marking position with respect to a circular sheet or the like carried by said carrier means; and electrical means adapted to be connected to a brake pedal of the vehicle and operatively connected to said marking instrument for automatically moving the latter into said position when the brake pedal of the vehicle is operated, whereby the marking instrument will indicate the manner in which the brake is operated while the reduction in the speed recorded during driving of said carrier means by said second drive means may be correlated with the brake operation indicated on the sheet by said marking instrument to show the effect of brake operation on the vehicle.

7. In a tachograph, as recited in claim 1, the speed of the vehicle being recorded during rotation of said carrier means by said first drive means as well as during rotation of said carrier means by said second drive means, a marking instrument positioned for movement toward and away from a predetermined marking position with respect to a circular sheet or the like carried by said carrier means; electrical means operatively connected to said marking instrument for moving the latter into said position when an electrical circuit of said electrical means is closed, said electrical means including a switch which may be closed for closing the circuit; and fluid pressure means operatively connected to said switch and responsive to the operation of a brake of the vehicle for automatically closing said switch when the brake is operated, whereby the marking instrument will indicate the manner in which the brake is operated while the reduction in the speed recorded during driving of said carrier means by said second drive means may be correlated with the brake operation indicated on the sheet by said marking instrument to show the effect of brake operation on the vehicle.

8. In a tachograph, in combination, spring motor means including an outer housing, a drive shaft extending coaxially from the interior of said housing, and a spiral spring in said housing coiled about said shaft and respectively fixed at its ends to said shaft and housing, said shaft and housing being turnable with respect to each other; carrier means carried by said shaft for carrying a sheet or the like on which the operation of a vehicle is adapted to be recorded; transmission means interconnecting said shaft and carrier means for turning the latter with said shaft when the latter turns in one direction while said housing remains stationary and for freeing said carrier means for rotation at a higher speed than said shaft, said spring motor means being operatively connected to a clockwork escapement mechanism which controls the speed of rotation of said shaft while said housing is stationary; a gear train extending between and operatively connected to said housing and carrier means for driving the latter from said housing, while by-passing said shaft, at a speed greater than said carrier means is turned by said shaft; and manually releasable lock means operatively connected to said gear train for preventing the operation of at least a portion thereof connected to said housing so as to maintain the latter stationary until said lock means is released, said gear train including a one-way drive located between a portion thereof connected to said carrier means and the remainder of said gear train so that said carrier means can be turned by said shaft while said housing is stationary, and said lock means including a gear of said train formed with an opening, a spring-pressed pin in said opening, and manually engageable means for moving said pin out of said opening.

9. In a tachograph as recited in claim 4, said a single spring motor operatively connected to said first drive means and said second drive means for operating both of said drive means.

10. In a tachograph as recited in claim 9, a clockwork escapement mechanism operatively connected with said spring motor to regulate speed of operation thereof.

References Cited in the file of this patent

UNITED STATES PATENTS

| | | |
|---|---|---|
| 1,053,085 | Cole | Feb. 11, 1913 |
| 1,098,931 | Akimoff | June 2, 1914 |
| 1,545,078 | Angus | July 7, 1925 |
| 1,583,954 | Bold | May 11, 1925 |
| 2,499,667 | Milster | Mar. 7, 1950 |
| 2,701,479 | Kuntny | Feb. 8, 1955 |
| 2,796,317 | Valenti et al. | June 18, 1957 |

FOREIGN PATENTS

| | | |
|---|---|---|
| 730,980 | Germany | Mar. 7, 1955 |
| 369,269 | Italy | Mar. 15, 1939 |

UNITED STATES PATENT OFFICE

CERTIFICATE OF CORRECTION

Patent No. 2,924,497             February 9, 1960

Paul Riegger et al.

It is hereby certified that error appears in the printed specification of the above numbered patent requiring correction and that the said Letters Patent should read as corrected below.

Column 7, line 27, for "twining" read -- turning --.

Signed and sealed this 19th day of July 1960.

(SEAL)

Attest:

KARL H. AXLINE
Attesting Officer

ROBERT C. WATSON
Commissioner of Patents